United States Patent [19]

Ikeda et al.

[11] Patent Number: 5,146,381
[45] Date of Patent: Sep. 8, 1992

[54] MAGNETIC DISK JACKET

[75] Inventors: Hiroshi Ikeda; Nobuyuki Kishine; Tsuyoshi Otani; Mashahiko Niinomi, all of Ichikai, Japan

[73] Assignee: KAO Corporation, Tokyo, Japan

[21] Appl. No.: 676,071

[22] Filed: Mar. 27, 1991

[30] Foreign Application Priority Data

Mar. 28, 1990 [JP] Japan .................................. 2-80489

[51] Int. Cl.5 ...................... G11B 23/033; G11B 5/41
[52] U.S. Cl. ..................................... 366/133; 360/128
[58] Field of Search ...................... 360/133, 128, 137; 369/291

[56] References Cited

U.S. PATENT DOCUMENTS

| 4,604,672 | 8/1986 | Davis et al. | 360/133 |
| 4,901,180 | 2/1990 | Oishi | 360/133 |
| 4,908,817 | 3/1990 | Sandell et al. | 369/291 |
| 4,979,065 | 12/1990 | Ikebe et al. | 360/133 |
| 4,998,176 | 3/1991 | Takemae | 360/133 |
| 5,060,105 | 10/1991 | Howey | 360/133 |
| 5,085,723 | 2/1992 | Nakaki et al. | 360/133 |

Primary Examiner—Robert S. Tupper
Attorney, Agent, or Firm—Birch, Stewart, Kolasch & Birch

[57] ABSTRACT

In a magnetic disk jacket including a liner partly welded to the inner surface of a case and adapted to clean the surface of a magnetic disk, the liner contains 0.001 to 0.05g of a polydimethylsiloxane derivative having a viscosity of from 50 to 3000 cSt at 25° C. and having a polyether group or both polyether group and epoxy group in a molecule per 1 g of the liner.

1 Claim, 2 Drawing Sheets

MAGNETIC DISK JACKET

BACKGROUND OF THE INVENTION

1. Field of the Invention

This invention relates to a magnetic disk jacket and more particularly to a magnetic disk jacket designed to improve cleaning performance of a magnetic disk.

2. Description of the Prior Art

The conventional magnetic disk jacket comprises a case and a liner partly welded to the inner surface of the case in order to clean the surface of a magnetic disk.

The liner is designed such that by properly adjusting the expanding condition of the liner through a welding mode thereof to the inner surface of the case, cleaning performance is improved or no dust is generated from the liner.

In the case of a magnetic disk jacket for a magnetic disk of 3.5 inches, a lifter is disposed between the liner and the inner surface of the case, so that the liner is partly expanded to the surface of the magnetic disk by the lifter and the surface of the magnetic disk is cleaned by the expanded portion, and in addition to the foregoing, the above-mentioned other countermeasures are adopted.

However, the conventional magnetic disk jacket is intended to improve the cleaning performance merely by adjusting the expanding condition of the liner and to prevent the occurrence of dust and the like contained in the liner merely depending on the welding mode of the liner to the inner surface of the case. Accordingly, there is a limit for improving the cleaning performance by such means as mentioned.

SUMMARY OF THE INVENTION

A general object of the present invention is to provide a magnetic disk jacket, in which the liner is provided with means for removing dust and the like in order to improve the cleaning performance and a stable cleaning performance can be maintained with the passage of time.

As a result of extensive study about the cleaning performance of a liner made by the inventors of the present invention, they found out that the above object can be achieved by having the liner contain a predetermined amount of particular compounds.

The present invention has been accomplished based on the above-mentioned finding. To achieve this object, there is essentially provided a magnetic disk jacket including a liner partly welded to the inner surface of a case and adapted to clean the surface of a magnetic disk, said liner containing 0.001 to 0.05 g of a polydimethylsiloxane derivative having a viscosity of from 50 to 3000 cSt at 25° C. and having a polyether group or both polyether group and epoxy group in a molecule. The content of the polydimethylsiloxane derivative is 0.001 g to 0.05 g per 1 g of the liner.

Since the magnetic disk jacket of the present invention includes a liner containing a polydimethylsiloxane having a polyether group or both polyether group and epoxy group, the liner exhibits an improved cleaning performance against dust and the like. The polydimethylsiloxane derivative hardly migrates to a magnetic disk from the jacket, and therefore the magnetic disk jacket of the present invention can maintain stable cleaning performance.

BRIEF DESCRIPTION OF THE DRAWINGS

FIG. 2(a) shows the lower half having a lifter, and FIG. 2(b) is a view showing the upper half before the liner is welded thereto.

DETAILED DESCRIPTION OF THE INVENTION

A magnetic disk jacket of the present invention can be applied to magnetic disk jackets of various sizes. Magnetic disk jackets of various sizes incorporated with the present invention are basically constructed in the same way as the conventional magnetic disk jackets of various sizes. In this embodiment, the present invention is applied to a magnetic disk jacket of, for example, 3.5 inches. This will be described with reference to FIGS. 1 and 2.

Figure 1:
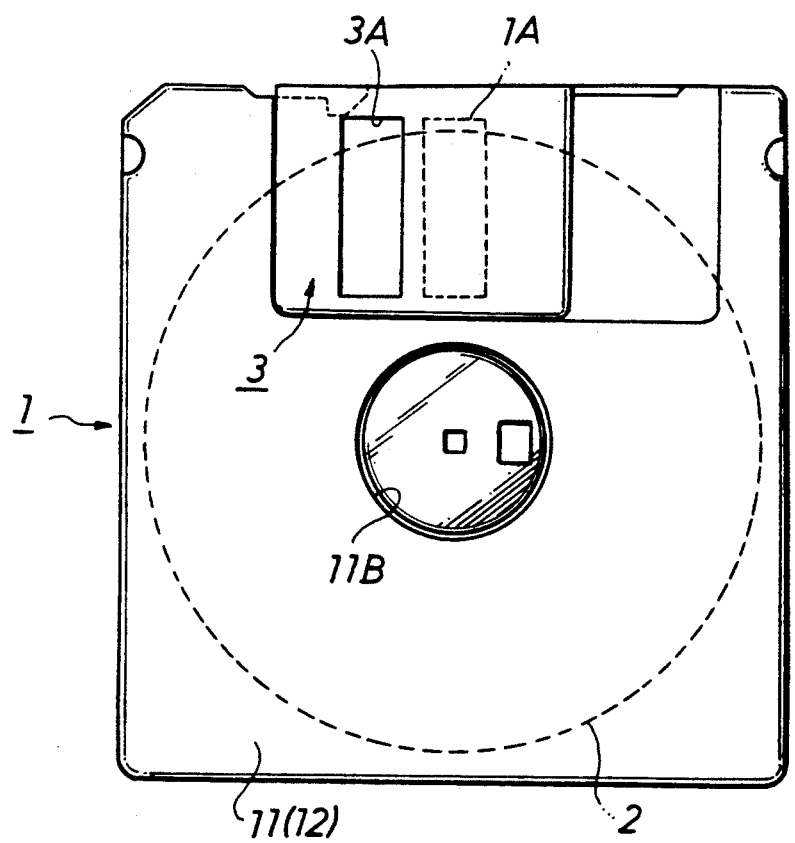
FIG. 1 is a plan view showing one embodiment of a magnetic disk jacket of the present invention.

The magnetic disk jacket of the present invention, as shown in FIG. 1, is constructed such that a magnetic disk 2 is rotatably disposed within a case 1 formed of a lower half 11 and an upper half 12, and information is written into the magnetic disk 2 or information written in the magnetic disk 2 is reproduced through a generally central rectangular head opening 1A which is formed one-sidedly in a front edge (with reference to the loading direction of the magnetic disk jacket) of the case 1. The case 1 is provided with a shutter 3 slidably mounted thereto along the front edge. The shutter 3 is designed such that the head opening 1A of the case 1 is opened and closed by an opening 3A of the shutter 3 when information is recorded/reproduced.

The lower half 11 is provided with a lifter 4 and a liner 5 attached to the inner surface thereof. The upper half 12 is also provided with a lifter formed on the inner surface thereof and adapted to cover a projection 12C which is formed in such a manner as to be opposite the lifter 4. The arrangement being such that both surfaces of the magnetic disk 2 contained in the case 1 are cleaned chiefly between the lifter 4 and the projection 12C (see FIGS. 2(a) and 2(b)).

Figure 2A:
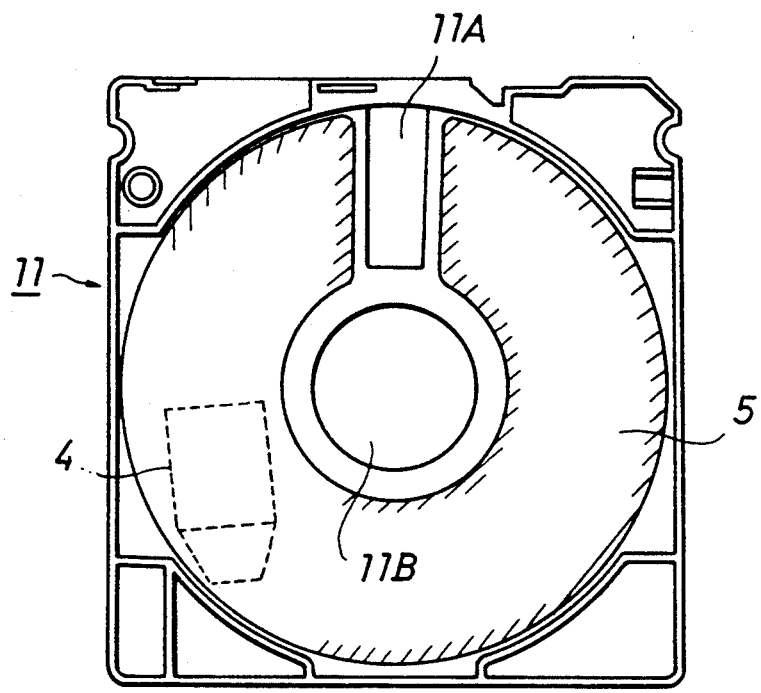
FIGS. 2(a) and 2(b) respectively are plan views showing a lower half and an upper half of the magnetic disk jacket of FIG. 1.
Figure 2B:
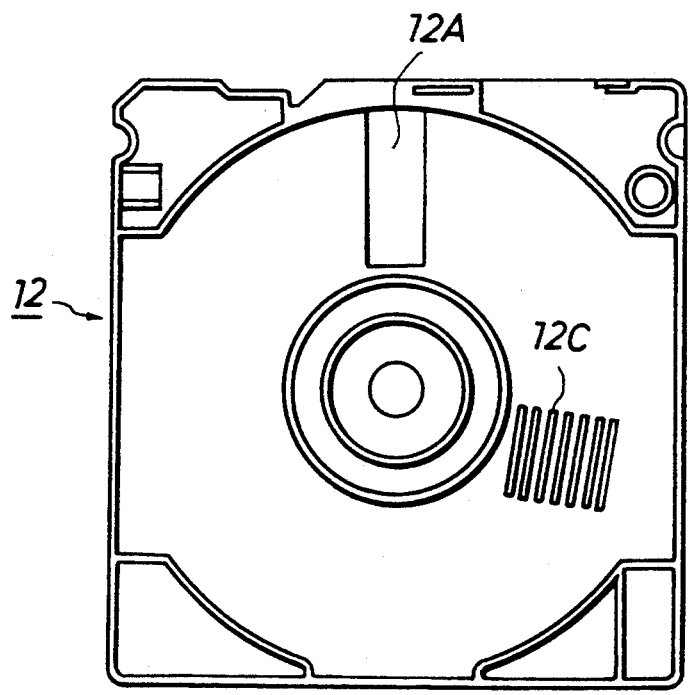

The lower half 11 has a head opening 11A formed in a generally central portion one-sided to the front edge thereof, so that a magnetic head approaches thereto. The lower half 11 also has a center opening 11B with which a hub of the magnetic disk 2 faces. The liner 5, as shown in FIG. 2(a), is formed in a generally C-shape surrounding the center opening 11B and leaving a portion corresponding to the head opening 11A "not surrounded". The liner 5 also has a sufficient width so that recording areas of both surfaces of the magnetic disk 2 are sandwiched between the liner 5 of the lower half 11 and a liner 5 welded to the upper half 12 shown in FIG. 2(b) in order to clean both surfaces of the magnetic disk 2.

In the magnetic disk jacket of the present invention, the liner contains 0.001 to 0.05 g of a denaturated chain polydimethylsiloxane having a viscosity of from 50 to 3000 cSt at 25° C. and having a polyether group or both polyether group and epoxy group in a molecule per 1 g of the liner.

The viscosity of the polydimethylsiloxane derivative is in the range of from 50 to 3000 cSt at 25° C. and more preferably from 500 to 2000 cSt. If the viscosity is less than 50 cSt at 25° C., there is concern that the compound tends to migrate to magnetic disk 2 to contaminate the magnetic disk 2 because the viscosity is too low. On the other hand, if the viscosity exceeds 3000 cSt at 25° C., there is concern that the cleaning performance becomes extremely bad.

The polydimethylsiloxane derivative has a polyether group or both polyether group and epoxy group in a molecule.

The polydimethylsiloxane derivative having a polyether group can be obtained by reacting a polydimethylsiloxane with an ethylene oxide and/or a propylene oxide. Similarly, the polydimethylsiloxane derivative having both polyether group and epoxy group can be obtained by reacting a polydimethylsiloxane derivative with an ethylene oxide. Such obtained polydimethylsiloxane derivative has stronger bonding force to the liner 5 than a polydimethylsiloxane, and hardly migrates to a magnetic disk.

The magnetic disk jacket of the present invention includes the liner 5 containing 0.001~0.05 g, more preferably 0.003~0.02 g of the above-mentioned compound per 1 g of the liner 5. If the content is less than 0.001 g, there is no meaning for containing the above-mentioned compound. On the other hand, if the content exceeds 0.05 g, there is concern that the compound excessively migrates to the magnetic disk 2 to jeopardize the cleaning performance of the liner 5 because the content of the polydimethylsiloxane in the liner becomes too low.

As described in the above, by making the liner 5 contain a predetermined amount of the polydimethylsiloxane derivative, very effective cleaning performance can be attained. In addition, since the polydimethylsiloxane derivative hardly migrates from the liner 5 to the magnetic disk, a stable cleaning performance can be maintained. Moreover, the dust, etc. in the liner 5 can be captured therein by the polydimethylsiloxane derivative so that the dust, etc. will not be liberated therefrom.

According to the magnetic disk jacket of the present invention, while the liner is in contact with the rotating magnetic disk, dust, etc. existing on the surfaces of the magnetic disk are effectively removed through the polydimethylsiloxane derivative contained in the liner.

Next, the present invention will be concretely described by way of the following embodiments. It is noted, however, that the present invention is not limited to the following embodiments.

EMBODIMENTS 1 THROUGH 6

In these embodiments, invented articles 1 through 3 were made by changing the content of a commercially available polydimethylsiloxane derivative having polyether group (TSF4452 manufactured by Toshiba Silicon K.K.) contained in the liner 5 in the manner as shown in Table 1 listed hereinafter.

Likewise, invented articles 4 through 6 were made by changing the content of a commercially available polydimethylsiloxane derivative having epoxy group and polyether group (X-60-164 manufactured by Shinetsu Kagaku K.K.) contained in the liner 5 in the manner as shown in Table 1 listed hereinafter.

COMPARATIVE EXAMPLES 1 THROUGH 3

These examples are for the purpose of comparison with the invented articles 1 through 6. Comparative articles 1 through 3 were made by changing the content of a polydimethylsiloxane contained in the liner 5 in the manner as shown in Table 1 listed hereinafter.

Tests for checking the cleaning performance and for checking the migration of these compounds to the magnetic disk 2 were carried out on the invented articles 1 through 6 and on the comparative articles 1 through 3 in the following manners.

CLEANING PERFORMANCE TEST

For the test, a camera was placed in front of the head opening 1A to determine the amount of dust on the surfaces of the respective magnetic disks 2 of the invented articles and of the comparative articles. Concretely, the test was carried out in the following manner.

First, the magnetic disk was rotated at a rotational speed of 24 rpm. During one rotation of the magnetic disk, twenty five (25) pictures were taken at constant intervals by the camera in front of the head opening 1A and all the dusts in each picture were counted and totaled.

Each numeric value in the under-listed table 1 indicates a relative value when the existing amount of dust on the surface of a magnetic disk disposed in a magnetic disk jacket having a liner 5 which has no chemical compound is presumed to be 100. Therefore, it indicates that if the numeric value is small, the existing amount of dust on the surface of the magnetic disk is proportionally small and the cleaning performance is excellent.

MIGRATION TEST OF POLYDIMETHYLSILOXANE DERIVATIVES TO MAGNETIC DISK

This test is intended such that the magnetic disk 2 inserted into a magnetic disk jacket is rotated for a predetermined time under a certain condition and thereafter, dynamic friction coefficients between each magnetic disk 2 of the invented articles and of the comparative articles and the magnetic head are measured and migration of polydimethylsiloxane derivatives to the magnetic disk 2 is evaluated. Concretely, the test was carried out as follows.

First, the magnetic disk 2 disposed in the magnetic disk jacket was rotated at a rotational speed of 300 rpm for ten days under the circumstance of 40° C. and 80% RH. Then, the magnetic disk 2 was taken out of the magnetic disk jacket and the magnetic head was brought into contact with both surfaces of the magnetic disk 2 under pressure of 30 g load while maintaining the rotational speed of 300 rpm under the circumstance of 25° C. and 50% RH. At that time, electric current to the motor is required to be increased in order to maintain the rotational speed of 300 rpm. A dynamic frictional force was obtained through a back-calculation by using the increased portion of the electric current value and a dynamic friction coefficient was calculated from such obtained dynamic frictional force.

Each numeric value in table 1 indicates a relative value when the dynamic friction coefficient of the magnetic disk 2 is presumed to be 100 wherein the test is carried out using a magnetic disk jacket having a liner which has no chemical compound. Therefore, it indicates that if the numeric value is close to 100, migration of the polydimethylsiloxane derivatives is proportionally low.

(1) Results of Cleaning Performance Test

According to the measured results shown in table 1, the relative value is 16~24 in the invented articles 1~3, 21~23 in the invented articles 4~6 and 19~23 in the comparative articles 1~3. As seen from the above, the relative values are generally equally low, and the initial cleaning performance is almost the same between the invented articles and comparative articles.

(2) Results of Migration Test

According to the migration test shown in table 1, the relative values are generally equal to 100 in the invented articles 1~6. However, the relative values are so high as 111~115 in the comparative articles 1~3. From the foregoing, it is known that the polydimethylsiloxane derivatives are low in migration to the magnetic disk 2 when compared with the polydimethylsiloxane.

Accordingly, it is known that the invented articles 1~6 are excellent in cleaning performance and is able to maintain stable cleaning performance with the passage of time because the polydimethylsiloxane derivatives can be stably held in the liner 5.

On the other hand, polydimethylsiloxane of comparative articles excessively migrates to the magnetic disk from the liner 5 and therefore stable cleaning performance is not attainable for long term.

TABLE 1

| Silicon compounds | | Viscosity (cSt.)/ Content (g) | Existing amount of dust (relative value) | Dynamic friction coefficient (relative value) |
|---|---|---|---|---|
| Invented articles (polydimethylsiloxane having polyether group) | 1 | 1000/0.003 | 24 | 101 |
| | 2 | 1000/0.006 | 21 | 103 |
| | 3 | 1000/0.015 | 16 | 103 |
| Invented articles (polydimethylsiloxane having epoxy group and polyether group | 4 | 160/0.003 | 25 | 99 |
| | 5 | 160/0.006 | 24 | 100 |
| | 6 | 160/0.015 | 21 | 100 |
| Comparative articles polydimethylsiloxane | 1 | 1000/0.003 | 23 | 111 |
| | 2 | 1000/0.006 | 22 | 114 |
| | 3 | 1000/0.015 | 19 | 115 |

What is claimed is:

1. A magnetic disk jacket including a liner partly welded to the inner surface of a case and adapted to clean the surface of a magnetic disk, said liner containing 0.001 to 0.05 g of a polydimethylsiloxane derivative having a viscosity of from 50 to 3000 cSt at 25° C. and having a polyether group or both polyether group and epoxy group in a molecule per 1 g of the liner.

* * * * *